US011938520B2

(12) United States Patent
Masson

(10) Patent No.: US 11,938,520 B2
(45) Date of Patent: Mar. 26, 2024

(54) AUTOMATIC MACHINE FOR SORTING OR INSPECTING PASSING OBJECTS, EQUIPPED WITH A CLEANING DEVICE

(71) Applicant: PELLENC SELECTIVE TECHNOLOGIES, Pertuis (FR)

(72) Inventor: Florent Masson, Pertuis (FR)

(73) Assignee: PELLENC SELECTIVE TECHNOLOGIES, Pertuis (FR)

( * ) Notice: Subject to any disclaimer, the term of this patent is extended or adjusted under 35 U.S.C. 154(b) by 587 days.

(21) Appl. No.: 17/069,624

(22) Filed: Oct. 13, 2020

(65) Prior Publication Data

US 2021/0107042 A1 Apr. 15, 2021

(30) Foreign Application Priority Data

Oct. 14, 2019 (FR) ........................................ 1911421

(51) Int. Cl.

*B08B 1/00* (2006.01)
*B07C 5/342* (2006.01)
(Continued)

(52) U.S. Cl.

CPC .............. *B08B 1/005* (2013.01); *B07C 5/342* (2013.01); *B07C 5/368* (2013.01); *B08B 1/008* (2013.01);
(Continued)

(58) Field of Classification Search

None
See application file for complete search history.

(56) References Cited

U.S. PATENT DOCUMENTS

| | | | |
|---|---|---|---|
| 4,033,099 A | 7/1977 | Friedel, Jr. et al. | |
| 5,335,791 A | 8/1994 | Eason | |
| 5,431,289 A | 7/1995 | Hoffman | |

FOREIGN PATENT DOCUMENTS

| | | | |
|---|---|---|---|
| CN | 205732017 | * | 11/2016 |
| KR | 20090015530 | * | 2/2009 |

(Continued)

OTHER PUBLICATIONS

Translation of CN 205732017 by Huang, published Nov. 30, 2016.*
(Continued)

*Primary Examiner* — Mikhail Kornakov
*Assistant Examiner* — Ryan L Coleman
(74) *Attorney, Agent, or Firm* — IPSILON USA, LLP

(57) ABSTRACT

An automatic machine (2) for processing objects (3) passing in a flow (F) on a conveyor (4) has a selective ejection device (1) with at least one bar (5) with nozzles (6) that is disposed transverse to the direction of said flow (F), after the outlet or tipping end of said conveyor (4), and having an active surface strip (7) that corresponds to the installation region of the outlet openings (6') of the nozzles (6) of the pneumatic bar (5), this surface strip (7) being situated beneath the conveying plane (4'') of the conveyor (4). This machine has a device (8) for cleaning at least said surface strip (7), this cleaning device (8) having at least one cleaning head (9) that is able to move in translation along the longitudinal axis (AL) of the bar (5) and at least over the entire extent of the installation or overlap region, said or each cleaning head (9) comprising at least one scraping member (10), which moves in contact with at least said surface strip (7), and at least one nozzle for blowing air of which the pressurized jet is directed toward said surface strip (7) and precedes the scraping member (10) during the movement of the mobile cleaning head (9).

8 Claims, 6 Drawing Sheets

(51) Int. Cl.

| | |
|---|---|
| ***B07C 5/36*** | (2006.01) |
| ***B08B 1/02*** | (2006.01) |
| ***B08B 5/02*** | (2006.01) |
| ***B08B 7/04*** | (2006.01) |
| ***B08B 13/00*** | (2006.01) |

(52) U.S. Cl.
CPC ................ *B08B 1/02* (2013.01); *B08B 5/023* (2013.01); *B08B 7/04* (2013.01); *B08B 13/00* (2013.01); *B07C 2501/0054* (2013.01)

(56) References Cited

FOREIGN PATENT DOCUMENTS

| | | | |
|---|---|---|---|
| KR | 20180061111 | * | 6/2018 |
| WO | WO 2017005772 | * | 1/2017 |
| WO | WO 2018123990 | * | 7/2018 |
| WO | 2018/211023 | | 11/2018 |

OTHER PUBLICATIONS

Translation of KR 20180061111 by Peng, published Jun. 7, 2018.*
Translation of KR 20090015530 by Pak, published Feb. 12, 2009.*
Translation of WO 2018123990 by Kawamura, published Jul. 5, 2018.*
International Search Report dated Jun. 2, 2020.

* cited by examiner

[Fig. 1]
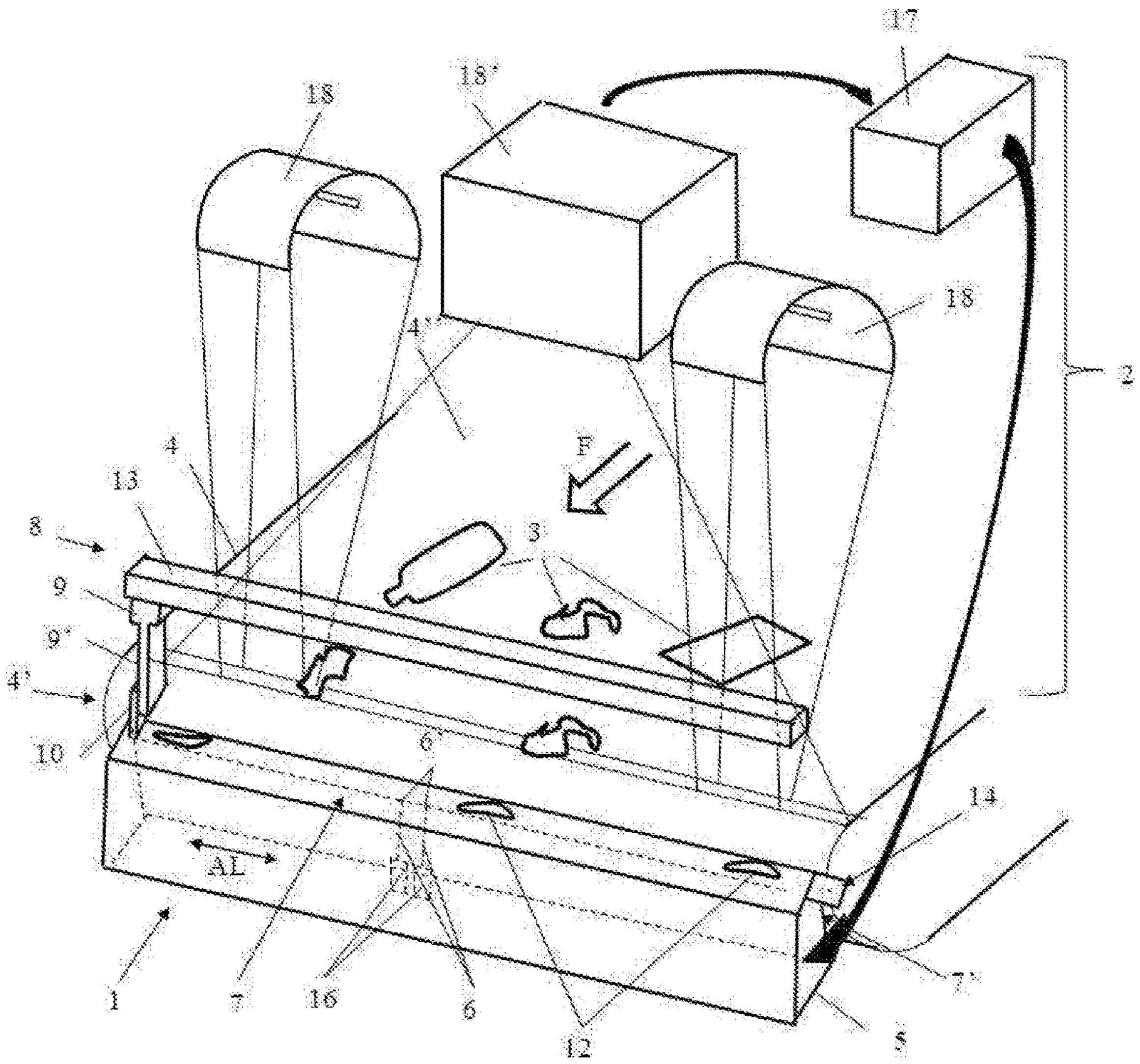

[Fig. 2]
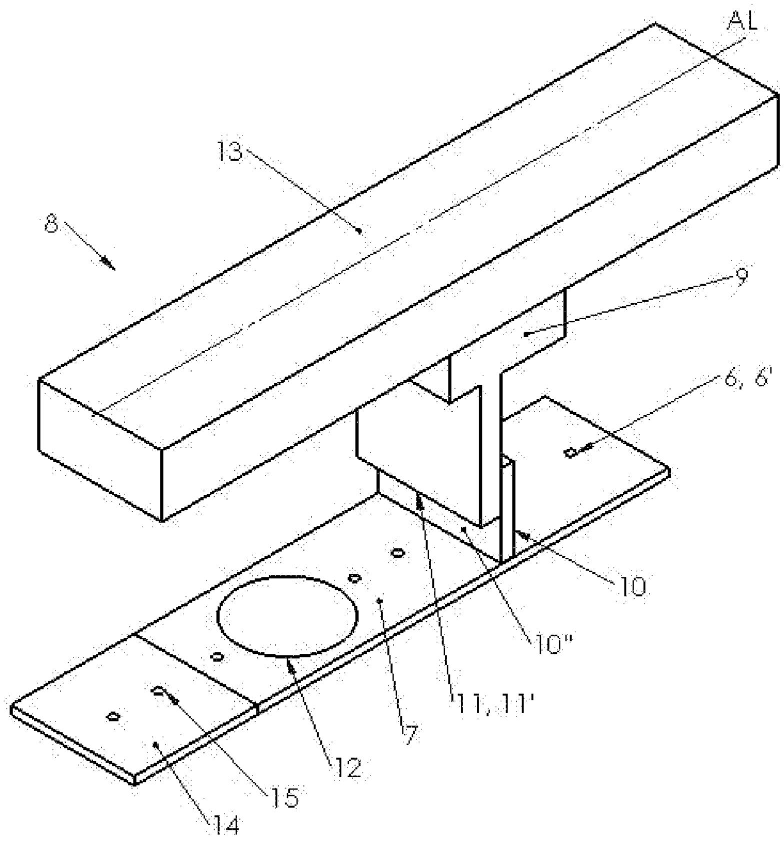

[Fig. 3]
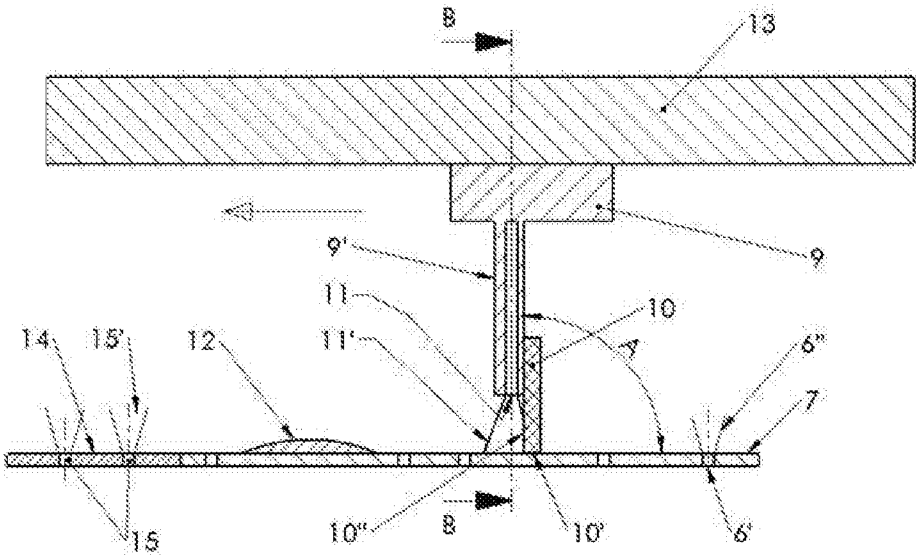

[Fig. 4]
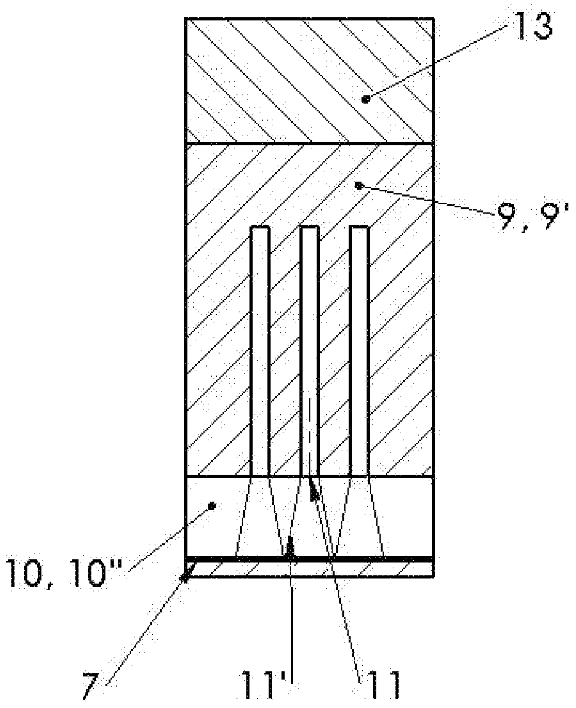

[Fig. 5]
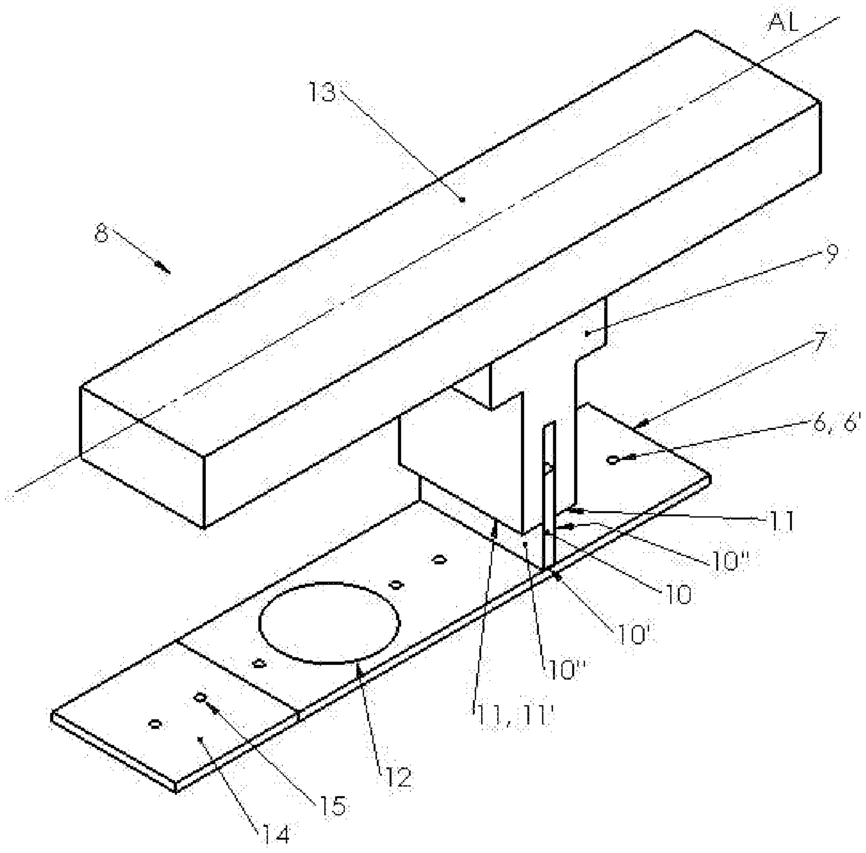

[Fig. 6]
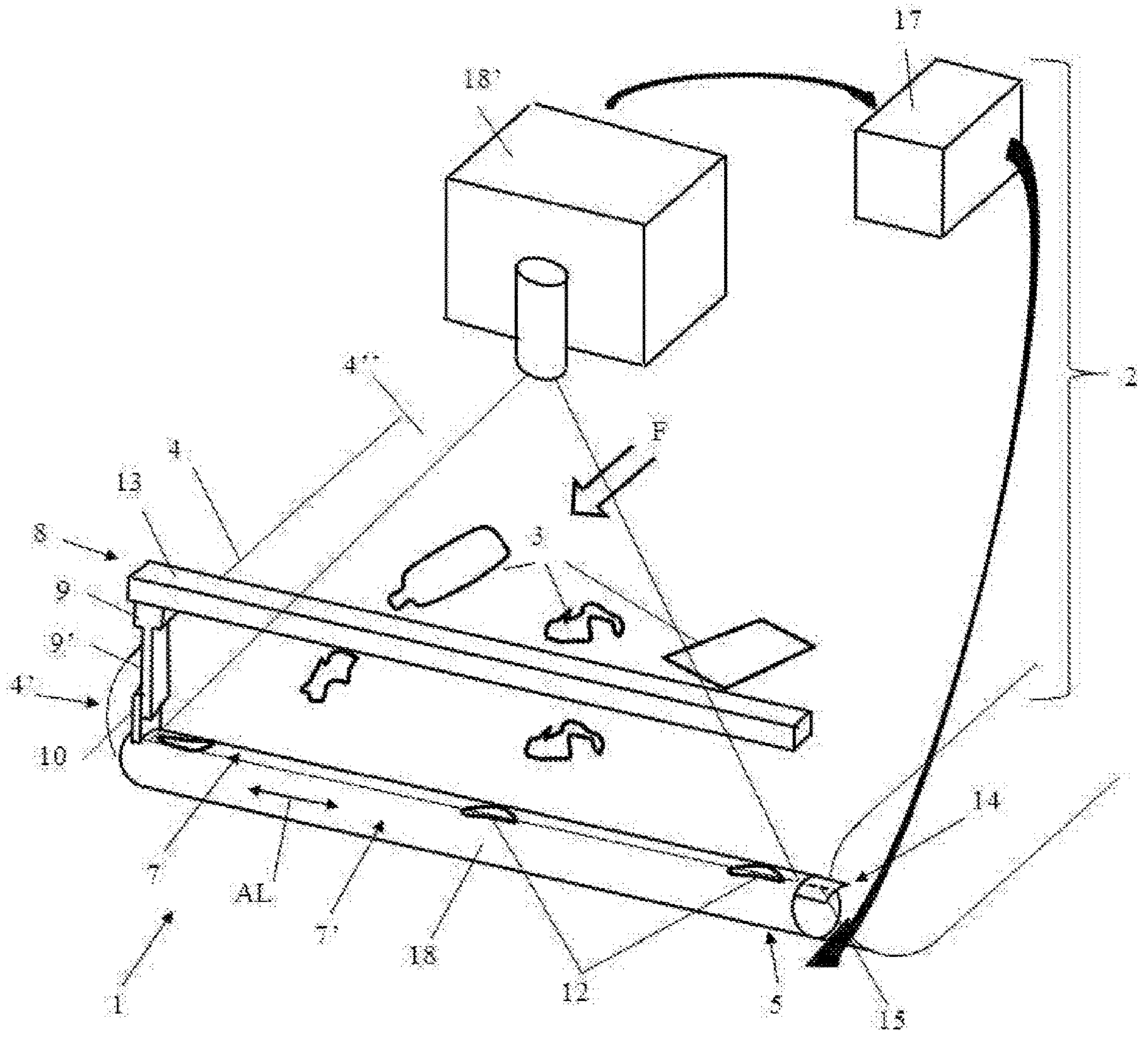

AUTOMATIC MACHINE FOR SORTING OR INSPECTING PASSING OBJECTS, EQUIPPED WITH A CLEANING DEVICE

RELATED APPLICATION

This application claims the benefit of priority from French Patent Application No. 19 11421, filed on Oct. 14, 2019, the entirety of which is incorporated by reference.

FIELD OF THE INVENTION

The present invention relates to the field of machines for automatically sorting or inspecting objects passing in a substantially single-layer flow, and more particularly to the pneumatic ejection devices or the detection devices, i.e. inspection radiation emitting and receiving devices, of such machines.

More particularly, a subject of the invention is an automatic machine for sorting or inspecting passing objects, equipped with a device for cleaning such an ejection or detection device.

DESCRIPTION OF THE RELATED ART

Machines for automatically sorting objects passing in a flow on a conveyor, of the conveyor belt type for example, typically analyze said objects on the fly and then, depending on the results of the analysis, discriminate between them, actively and/or passively (under gravity, for example) directing them into different containers or onto other conveyors. At the end of their movement on the conveyor, the discriminated objects are moved (by controlled positive action) by localized and directional jets of pressurized air that are produced by at least one ejection device that forms part of said machine.

FIG. 1 partially and schematically illustrates, by way of non-limiting example, a typical construction of such an automatic selective sorting machine.

Such a machine 2 is capable of automatically sorting individual objects 3 that are arranged substantially as a single layer and pass in a flow F on a conveyor 4. More precisely, this machine 2 is generally able and intended to discriminate between objects 3 on the basis of physical/chemical criteria, for example their chemical composition and/or their color. To that end, the machine 2 has at least one illumination or radiation application station 18 and at least one detection station 18', beneath which the flow F to be inspected passes. The machine 2 also comprises a management and control unit (for example an industrial computer 17) that processes the detection signals coming from the one or more stations 18' and controls at least one ejection system or device 1 depending on the conclusions of the computer 17 (definition of the category of each object).

The ejection device 1, situated at the end of the conveyor 4 and perpendicular to the passing flow F, comprises a rail or bar 5 that contains a plurality of solenoid valves 16 that are regularly spaced along the rod and are each connected to a circuit of pressurized air ending in an ejection nozzle 6. These solenoid valves 16 can be controlled at any moment, individually and independently of their neighbors, such that the machine 2 can precisely eject each object 3 that is recognized according to its specific shape without affecting the neighboring objects, this being dependent on the results of its previous inspection.

Automatic sorting machines of this type have been marketed by the applicant for a number of years (for example under the trade name “Mistral”—registered trademark) and are in particular described and shown in documents EP 1 243 350, EP 1 965 929 and WO 2018/211023.

As can be seen in FIG. 1, the physical nature of the objects and/or their preparation condition before the ejection step may lead to deposits 12 of objects or of fragments of objects, or even to deposits resulting from aggregation of particles, debris or similar, on the surfaces situated close to the ejection region and more particularly on the outer surface(s) of the rod 5 that is/are situated facing the natural trajectory of the flow at the outlet of the conveyor 4 (in particular the surface strip 7 with the outlets of the nozzles 6) as well as on the surfaces 7' that are situated on the ejection system facing the conveying system.

In particular, wet and/or tacky objects (paper and card, food residue, plastic films, etc.) accumulate easily on these types of surfaces.

In the absence of regular cleaning, these surfaces may become covered with deposits of varying thickness that may negatively affect the ejection trajectory of the objects and/or the natural falling trajectory of the objects at the outlet of the conveying system.

Regular cleaning is therefore necessary, and it is desirable for this to be performed without stopping operation of the sorting machine and while minimizing the disturbance of the passing flow.

One possible solution for avoiding such deposits and dispensing with the repeated cleaning operations consists in ejecting the objects downward by means of a bar situated at the top. Indeed, it is known that a high bar does not accumulate impurities by gravity. However, the sorting quality in this case is lower, since the ejection nozzles are typically at a distance of 20 cm from the objects instead of 5 cm for a low rod, and therefore act over a widened and less precise cone.

With a low bar with nozzles (which is more precise but is subject to the deposits mentioned), the simplest solution implemented to date consists in having an operator provided with a scraper intervene at regular intervals to clean the surfaces in question. These interventions can be quite frequent, up to multiple times per hour, and must occur without the machine being stopped, so as not to impede the sorting process. Upon each intervention during operation of the machine, there are real risks of catching, of objects scattering, and more generally of accidents owing to moving components, the risks of catching being particularly high for the surfaces 7'.

A similar problem to that mentioned above also arises for machines for inspecting objects passing in a flow on a conveyor by radiation, a non-limiting example of which is partially and schematically illustrated in FIG. 6.

Relative to a sorting machine, an inspection machine comprises similar measurement/processing members (radiation application device, radiation detection/receiving device, management/control/processing unit), but does not have an ejection device.

The role of such an inspection machine is to accumulate the conclusions on the nature of the various objects passing through the machine in the processing unit, to process them statistically and to transmit the information collected, generally for subsequent action or processing.

In the case of an inspection machine 2 such as that shown in FIG. 6, a common configuration is detection in transmission mode: the detection relies on an emitting side or device 18, for example with an illumination bar or rail 5, and a receiving side or device 18', for example a camera, these two devices being situated on either side of the flow of passing objects 3. For example, the camera 18' can be situated above the flow F and the illumination bar 5 below, and beyond the end of the conveyor 4, as illustrated in FIG. 6. The reverse configuration also exists, with illumination above and a detector below. In both of the abovementioned configurations, a surface strip 7 of a lower optical bar 5 (working in emission mode or in reception mode) is placed beneath the flow of waste or objects 3, and it is therefore subject to deposits 12 and liable to be fouled in the same way as the surface strip 7 mentioned above for the sorting machine.

In the case of the inspection machine 2, the surface strip 7 to be cleaned can correspond to the surface of a covering hood, of a window or of a similar cover that is transparent to the radiation used for the inspection, or at least to a part of such a surface that the radiation entering or leaving the lower optical bar effectively passes through.

In both types of processing machines mentioned above, it is desirable to automate this cleaning operation.

Purely mechanical systems of the windshield wiper type for cleaning illumination elements situated beneath the passing flow by scraping are already known from the prior art. They use a controlled movement to carry out a complete sweep of the surface to be cleaned, with a scraper or a brush. Their effectiveness is not guaranteed, in particular with certain flows, in particular owing to the rapid fouling of the scraper or brush and because accumulations at the two lateral ends may remain on the surface and immobilize the system.

Moreover, it is easily understood that possible systems for cleaning solely by air blowing and without mechanical action will be effective only on dry and non-tacky products.

Finally, cleaning systems that spray water or cleaning liquids, may or may not be combined with mechanical cleaning means, are not suitable for implementation with a bar with nozzles (swamping of the solenoid valves) and also require an additional fluid or even an additional consumable additive. Likewise, the use of a fluid causes problems on the upper surface of an illumination or detection system, with risks of leaking and short-circuiting the equipment situated beneath.

OBJECTS AND SUMMARY

The aim of the present invention is therefore to propose an automatic dry cleaning solution that can operate without stopping operation of the processing machine (even if the latter is running idle) and does not disturb the flow of passing objects, or their ejection, owing to the presence of said solution. Furthermore, this solution should advantageously use resources that are already present in the sorting or inspection machine and be able to be integrated into the ejection or detection device, so as to preferentially form a modular unit therewith.

In order to achieve this aim, a subject of the invention is an automatic machine for processing, in particular sorting or inspecting, objects passing in a flow on a conveyor, this machine having either a selective ejection device with at least one pneumatic bar or rail with nozzles, or a radiation emitting and receiving device with at least one optical bar, this bar being disposed transverse to the direction of said flow, after the outlet or tipping end of said conveyor, and having an active surface strip that corresponds to the installation region of the outlet openings of the nozzles of the pneumatic bar or to a coverage or overlap region of the radiation emitting or receiving means of the optical bar, this surface strip being situated beneath the conveying plane of the conveyor, which machine also comprises a device for cleaning at least said surface strip, this cleaning device having at least one cleaning head that is able to move in translation along the longitudinal axis of the bar and at least over the entire extent of the installation or overlap region, said or each cleaning head comprising at least one scraping member, which moves in contact with at least said surface strip, and at least one nozzle for blowing air of which the pressurized jet is directed toward said surface strip and precedes the scraping member during the movement of the mobile cleaning head so as to process at least said surface strip in order to remove deposits present on the latter.

BRIEF DESCRIPTION OF THE DRAWINGS

The invention will be better understood by virtue of the following description, which relates to preferred embodiments that are given by way of non-limiting example and explained with reference to the appended schematic drawings, in which:

FIG. 1 is a partial schematic perspective view of a sorting machine as mentioned above, equipped with an ejection device with a cleaning device according to a first embodiment of the invention;

FIG. 2 is a partial perspective view of the cleaning device shown in FIG. 1 and of the surface strip that is cleaned by this device;

FIG. 3 is a view in cross section on a plane perpendicular to the surface strip and parallel to the direction of movement of the cleaning head of the cleaning device that is partially shown in FIG. 2;

FIG. 4 is a view in cross section on B-B of the object shown in FIG. 3;

FIG. 5 is a view similar to that of FIG. 2, illustrating another embodiment of the cleaning device according to the invention, and FIG. 6 is a view similar to that of FIG. 1, illustrating an inspection machine operating in transmission mode and equipped with a detection device with an associated cleaning device according to a second embodiment of the invention.

DETAILED DESCRIPTION

FIGS. 1 and 6 partially illustrate a machine 2 for processing objects 3, in particular waste, namely a sorting machine 2 (FIG. 1) and an inspection machine (FIG. 6) respectively.

The objects 3 to be sorted or inspected pass in a substantially planar flow F on a belt conveyor 4.

As shown in FIGS. 1 and 6, such a machine 2 has, depending on its type (sorting or inspection), either a selective ejection device 1 with at least one pneumatic bar 5 with nozzles 6, or a radiation emitting and receiving device 1 (detection device comprising the emitting means 18 and receiving means 18') with at least one optical bar 5, this bar 5 being disposed transverse to the direction of said flow F, after the outlet or tipping end of said conveyor 4. This lower bar 5 has an active surface strip 7 that corresponds to the installation region of the outlet openings 6' of the nozzles 6 of the pneumatic bar 5 or to a coverage or overlap region of the radiation emitting or receiving means 18, 18' of the optical bar 5, this surface strip 7 being situated beneath the conveying plane 4" of the conveyor 4.

In accordance with the invention, the machine 2 also comprises a device 8 for cleaning at least said surface strip 7, this cleaning device 8 having at least one cleaning head 9 that is able to move in translation along the longitudinal axis AL of the bar 5 and at least over the entire extent of the installation or overlap region, said or each cleaning head 9 comprising at least one scraping member 10, which moves in contact with at least said surface strip 7, and at least one nozzle 11 for blowing air of which the pressurized jet 11' is directed toward said surface strip 7 and precedes the scraping member 10 during the movement of the mobile cleaning head 9 so as to process at least said surface strip 7 in order to remove deposits 12 present on the latter.

By implementing two dry cleaning means, with different natures and of which the actions combine to remove the deposits 12, simultaneously in a single device 8, the invention allows automatic and effective cleaning of the exposed and sensitive region of the bar 5, without interfering with the operation of the machine 2 and without risk for the operator. Furthermore, the invention does not require any consumable, advantageously makes use of a resource (compressed air) that is already present in the machine 2 (at least in the case of a sorting machine) and has a simple and compact construction that is easy to maintain.

According to an advantageous feature of the invention, the cleaning device 8 comprises a means 13 for guiding and driving said at least one cleaning head 9, this guiding and driving means being able and intended to move the latter above and in parallel along the surface strip 7, said cleaning head 9 having a plurality of blowing nozzles 11 that are aligned transversely relative to its direction of movement, in at least one row, and the scraping member 10 consisting of a flexible and elastically deformable blade.

Thus, apart from the simple translational movement of the cleaning head 9, no other movement is required in order to clear and defoul at least the surface strip 7.

In accordance with a preferred construction of the invention that becomes apparent in particular from FIGS. 1, 2, 3, 5 and 6, it may be provided that the means 13 for guiding and driving the cleaning head 9 forms or is integrated into a gantry or a rail that extends above the bar 5 (and parallel to the latter), and is arranged so as not to interfere with the passing and ejected objects 3, that the scraping member 10 in the form of a flexible blade is arranged in a plane substantially perpendicular to the longitudinal direction AL of the bar 5 and has an edge 10' of which the profile matches (by cutting and/or by deformation) the transverse profile of at least the surface strip 7, and wherein the blowing nozzles 11 are mounted in a support body 9' of the cleaning head 9 that bears said scraping member 10. The gantry 13 may enclose the means for driving the cleaning head 9 in translation (with a rack, with a chain, etc.), as well as the circuit for supplying the blowing nozzles 11 (not shown).

In accordance with a first variant embodiment of the invention, shown in the attached FIGS. 1 to 4 and 6 and designed to ensure unidirectional processing, the jets 11' from the blowing nozzles 11 are oriented and configured in such a way that the expelled air simultaneously strikes the surface strip 7 and at least one of the faces 10" of the scraping member 10 in the form of a blade, being directed toward the edge 10' of the latter, the processing by cleaning of the surface strip 7 in order to remove the deposits 12 present on the latter being carried out only in one of the two opposite directions of movement of the cleaning head 9 (direction in which the jets 11' precede the scraping member 10 during the movement).

In accordance with a second variant embodiment of the invention, shown in the attached FIG. 5 and designed for bidirectional processing, the cleaning head 9 has blowing nozzles 11 on either side of the scraping member 10, the pressurized air jets 11' coming from one row of blowing nozzles 11 striking one of the two opposite faces 10" of the scraping member 10 in the form of a blade, the processing by cleaning of the surface strip 7 in order to remove the deposits 12 present on the latter being carried out in both directions of movement of the cleaning head 9.

This second constructional variant is preferred since it is more effective and does not depend on a direction of movement of the head 9. In this case, the deposits 12 driven by the member 10 are discharged at each end of travel at the two opposite ends of the strip 7 and of the bar 5.

When one or more outer surface(s) of the rod 5 other than the surface strip 7 is/are subject to deposits 12, for example a surface 7' situated facing the outlet end 4' of the conveyor 4, the cleaning head 9 advantageously has one or more scraping member(s) 10 and a plurality of blowing nozzles 11 that are arranged, dimensioned and configured to process all of the outer surfaces 7, 7' of the pneumatic or optical bar 5 that are subject to the deposition of objects 3 (or similar) falling from the conveyor 4, these surfaces including the surface strip 7.

In accordance with a very beneficial feature of the invention, the outer surface(s) of the bar 5 that is/are processed by the cleaning head 9 during its movement above said bar and along its longitudinal axis AL, i.e. at least the surface strip 7, is/are extended continuously, at least at one of the longitudinal ends of said bar 5, by an additional surface 14 that forms a discharge region for the deposits 12 removed from at least the surface strip 7 and driven by the scraping member 10 during travel of the cleaning head 9, this or each discharge region 14 being advantageously provided with means 15 for evacuating the deposits 12 brought by the scraping member 10, which can move as far as this or these discharge region(s) 14 (and preferentially enter them).

Preferentially, the evacuation means 15 of the or each discharge region 14 are pneumatic. They can advantageously consist of at least one, preferably a plurality of, blowing nozzle(s) of which the outlets open at the or each additional surface 14, and that emit jets 15' of pressurized air in a manner that is permanent, cyclic or controlled depending on the movement of the cleaning head 9. The or each discharge region 14 may or may not form part of the rod 5 and its blowing nozzles 15 may or may not be supplied by the same compressed air supply circuit as the ejection nozzles 6.

The surface strip 7 may be planar and flat (as shown in FIG. 1) or be curved, or even domed (as shown in FIG. 6), in a plane containing the longitudinal axis AL of the rod 5 or perpendicular to this plane. In both cases, the profile of the edge of the blade 10 has a corresponding shape (straight/curved).

The angle A of the jets 11' from the blowing nozzles 11 with the surface strip 7 is advantageously less than or equal to 90°. At each end of this surface strip 7, at the discharge region(s) 14, the cleaning head 9 stops for a determined length of time so that the scraped and accumulated deposits 12 are not too voluminous and can be evacuated.

The cleaning operation is advantageously performed during a phase of operation in which the flow F is interrupted.

Of course, the ejection or inspection device 1 (with the cleaning device 8) can be entirely integrated into the structure of the machine 2.

As a variant, however, it may also be provided that it is in the form of a unit that is modular, structurally and functionally, integrated into a machine 2 for automatically sorting objects, in particular waste.

When the machine 2 is a sorting machine, the solenoid valves 10 that control the jets of air 6", 11', 15' are all controlled by a management and control unit 17 of said machine 2, a single pressurized air production unit (not shown) advantageously supplying all of said ejection and blowing nozzles 6, 11, 15. In the case of the inspection machine in FIG. 6, the nozzles 11 and 15 are controlled by the unit 17 and supplied, where appropriate, by a particular pressurized air source.

A person skilled in the art will understand, upon comparing FIGS. 1 and 6, that the sorting machine in FIG. 1 has a device for detection by reflection of which the components (illumination 18 and camera 18') are situated above the flow and in front of the outlet end 4' of the conveyor 4, whereas the machine for inspection by transmission in FIG. 6 comprises a device 1 for detection by transmission of which one of the components (illumination bar 18) is situated beneath the flow F and beyond the outlet end 4' of the conveyor 4 and of which the other component (camera 18') is situated facing and above the flow F.

A further subject of the invention is a modular unit for a machine 2 for automatically sorting or inspecting objects 3 passing in a planar flow F on a conveyor 4, this machine 2 having either a selective ejection device 1 with at least one rail or bar 5 with nozzles 6, or a radiation emitting or receiving device 1 with at least one optical bar 5, this bar 5 being disposed transverse to the direction of said flow F, after the outlet or tipping end of said conveyor 4, and having an active surface strip 7 that corresponds to the installation region of the outlet openings 6' of the nozzles 6 of the pneumatic bar 5 or to a coverage or overlap region of the radiation emitting and receiving means of the optical bar 5, this surface strip 7 being situated beneath the conveying plane 4" of the conveyor 4. This modular unit comprises a cleaning device 8 that forms part of a sorting machine as described above therewith.

Of course, the invention is not limited to the embodiments that are described and shown in the appended drawings. Modifications remain possible, particularly from the point of view of the composition of the various elements or by substituting technical equivalents, without in so doing departing from the scope of protection of the invention.

The invention claimed is:

1. An automatic machine for processing, sorting or inspecting, objects passing in a direction of flow on a conveyor, this machine having a selective ejection device with at least one pneumatic bar or rail with nozzles, said at least on pneumatic bar or rail being disposed transverse to the direction of said flow, after an outlet or tipping end of said conveyor, and having an active surface strip that corresponds to an installation region of outlet openings of the at least one pneumatic bar or rail with nozzles, said active surface strip being situated beneath a conveying plane of the conveyor, said machine also comprises a cleaning device for cleaning said active surface strip, this cleaning device having a cleaning head that is able to move in translation along a longitudinal axis of the at least one pneumatic bar or rail and at least over an entire extent of an installation or overlap region, said cleaning head comprising at least one scraping member, which moves in contact with said active surface strip, and a plurality of blowing nozzles for blowing air, said blowing nozzles generating a pressurized jet that is directed toward said active surface strip and precedes the scraping member during movement of the cleaning head so as to process at least said active surface strip in order to remove deposits present on the active surface strip, wherein the scraping member is in the form of a flexible and elastically deformable blade and is arranged in a plane substantially perpendicular to the longitudinal axis of the at least one pneumatic bar or rail, wherein the plurality of blowing nozzles are mounted in a support body of the cleaning head, wherein the support body bears said scraping member, and wherein the blade comprises two faces that face in opposite directions, wherein the pressurized jet is oriented such that expelled air of the pressurized jet simultaneously strikes the active surface strip and one of the faces of the scraping member, and wherein said expelled air is directed toward an edge of said one of the faces of the scrapping member, and wherein said plurality of blowing nozzles includes nozzles located on opposite sides of the scraping member, and wherein said opposite sides are separated by the blade.

2. The machine as claimed in claim 1, wherein the cleaning device comprises a means for guiding and driving said cleaning head, this guiding and driving means being able to move the cleaning head above the active surface strip and in parallel along the active surface strip, said plurality of blowing nozzles including a row of blowing nozzles aligned transversely relative to a direction of movement of the cleaning head.

3. The machine as claimed in claim 1, wherein the means for guiding and driving the cleaning head forms or is integrated into a gantry or a rail that extends above the at least one pneumatic bar or rail, said cleaning head arranged so as not to interfere with passing and ejected objects.

4. The machine as claimed in claim 1, wherein cleaning of the active surface strip in order to remove the deposits present on the active surface strip is carried out in two directions of movement of the cleaning head.

5. The machine as claimed in claim 1, wherein said plurality of blowing nozzles are arranged, dimensioned and configured to process all outer surfaces of the at least one pneumatic bar or rail that are subject to the deposition of objects or object debris falling from the conveyor, these surfaces including the active surface strip.

6. The machine as claimed in claim 1, wherein outer surfaces of the at least one pneumatic bar or rail that are cleaned by the cleaning head during movement of the cleaning head above said at least on pneumatic bar or rail, and wherein an additional surface that forms a discharge region for deposits removed from at least the active surface strip and driven by the scraping member during travel of the cleaning head, this discharge region being provided with means for evacuating deposits brought by the scraping member, which can move as far as the discharge region.

7. The machine as claimed in claim 6, wherein the means for evacuating are pneumatic and include a plurality of blowing nozzles with outlets that open at the additional surface and that emit jets of pressurized air in a manner that is permanent, cyclic or controlled depending on movement of the cleaning head.

8. The machine as claimed in claim 1, wherein the cleaning device forms, with the at least one pneumatic bar or rail, a unit that is modular and structurally integrated into said machine for processing, sorting or inspecting, objects.

* * * * *